Aug. 26, 1924.

J. G. BALDWIN 1,506,553

OILING SYSTEM FOR INTERNAL COMBUSTION ENGINES

Filed Feb. 8, 1923

WITNESSES

INVENTOR
J. G. BALDWIN
BY
ATTORNEYS

Patented Aug. 26, 1924.

1,506,553

UNITED STATES PATENT OFFICE.

JAMES GRANVILLE BALDWIN, OF ASHEVILLE, NORTH CAROLINA.

OILING SYSTEM FOR INTERNAL-COMBUSTION ENGINES.

Application filed February 8, 1923. Serial No. 617,852.

*To all whom it may concern:*

Be it known that I, JAMES GRANVILLE BALDWIN, a citizen of the United States, and a resident of Asheville, in the county of Buncombe and State of North Carolina, have invented a new and Improved Oiling System for Internal-Combustion Engines, of which the following is a full, clear, and exact description.

This invention relates to improvements in internal combustion engines, and has particular reference to an oiling system therefor.

An object of the invention is to provide an improved construction, wherein the oil will be effectively conveyed to the crank shaft bearings to be lubricated and a thorough lubrication of said bearings obtained.

Another object is to provide a lubricating system, which may be used in conjunction with known types of motors without departing materially from the designs thereof.

The above and other objects will appear more clearly from the following detail description, when taken in connection with the accompanying drawing, which illustrates preferred embodiments of the inventive idea.

In the drawing—

Figure 1:
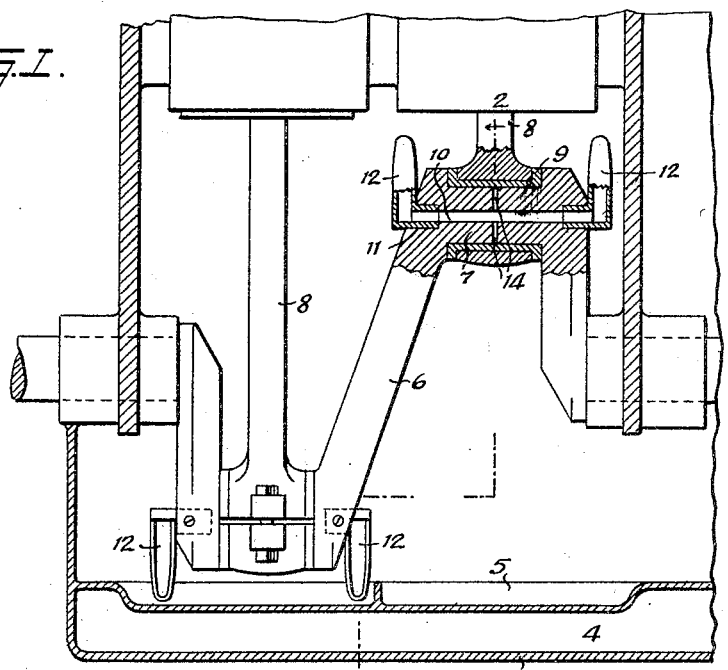
Figure 1 is a fragmentary longitudinal section on the line 1—1 of Figure 2 through the crank case of an internal combustion engine illustrating one form of the invention.

Referring more particularly to the accompanying drawing, the numeral 3 indicates the crank case of an internal combustion engine of any desired construction, which includes the usual oil reservoir 4, above which are disposed the oil pans 5, to which the lubricant is fed from the reservoir in any well known manner. The crank shaft 6 including the usual crank pins 7 varying in number in accordance with the number of cylinders in the engine is journaled in the crank case and has connected to each of said pins the connecting rod 8, the lower end of which encircles and engages the usual bearing 9, the lubrication of which is accomplished by the present invention.

Figures 2, 3:
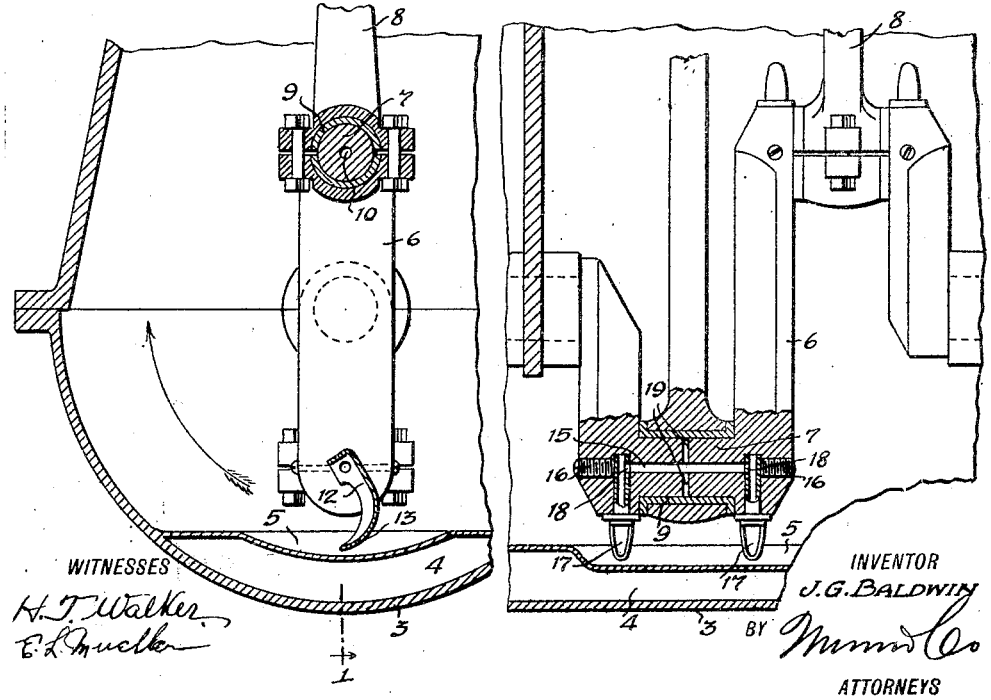
Figure 2 is a transverse section on the line 2—2 of Figure 1.
Figure 3 is a view similar to Figure 1 showing a slightly different form of the invention.

In accordance with the construction shown in Figures 1 and 2 each of the crank pins 7 is provided with a longitudinally extending passage 10, each end of which is preferably enlarged, as indicated at 11, to receive the inner angular end of a dipper 12, which preferably has its free end curved, as indicated at 13, so as to facilitate the dipping of the oil from an adjacent pan 5. By thus mounting the dippers 12 at both ends and against the cheeks of the crank pin 7 so that the same will extend beyond the ends thereof and out of alignment with the connecting rod attached to the crank pin, it will be obvious that as the crank pin passes through the lowermost portion of its orbit the dippers will effectively dip the oil from the adjacent pan and convey the same into the longitudinal passage 10 during the upward movement of the crank pin. As the oil enters the passage 10 it is conveyed to the bearing 9 through a plurality of radially disposed ports 14 having their inner ends communicating with said passage and their outer ends with the inner surface of the bearing 9.

In Figure 3, the crank pin 7 is provided with a passage 15 therethrough, the outer ends of which may be closed by screw plugs 16 when the dippers are not mounted in said ends, as in Figure 1. The embodiment shown in Figure 3 contemplates mounting the dippers 17 in the face of the crank pin inwardly of the ends or cheeks thereof and providing said dippers at their inner ends each with an opening 18 which communicates with the passage 15 to permit oil to be fed to the bearing 9 through the ports 19 similar to the ports 14. The inner ends of the dippers are engaged by the screw plugs to aid in retaining the dippers in operative position.

What is claimed is:

In an oiling system for internal combustion engines, a shaft including a crank pin having a longitudinal passage therethrough and radially disposed ports extending from said passage intermediate the ends thereof, dippers mounted in said crank pin laterally of said longitudinal passage and having openings communicating with said passage, and means mounted in the ends of said passage for closing said ends and engaging said dippers to retain the same in operative position to permit of lubricant being fed through the dippers and passage into said ports.

JAMES GRANVILLE BALDWIN.

Witness:
ISOBEL KILLIARN.